May 3, 1938. H. A. ANDREAS 2,115,837
PULLEY
Filed March 11, 1937
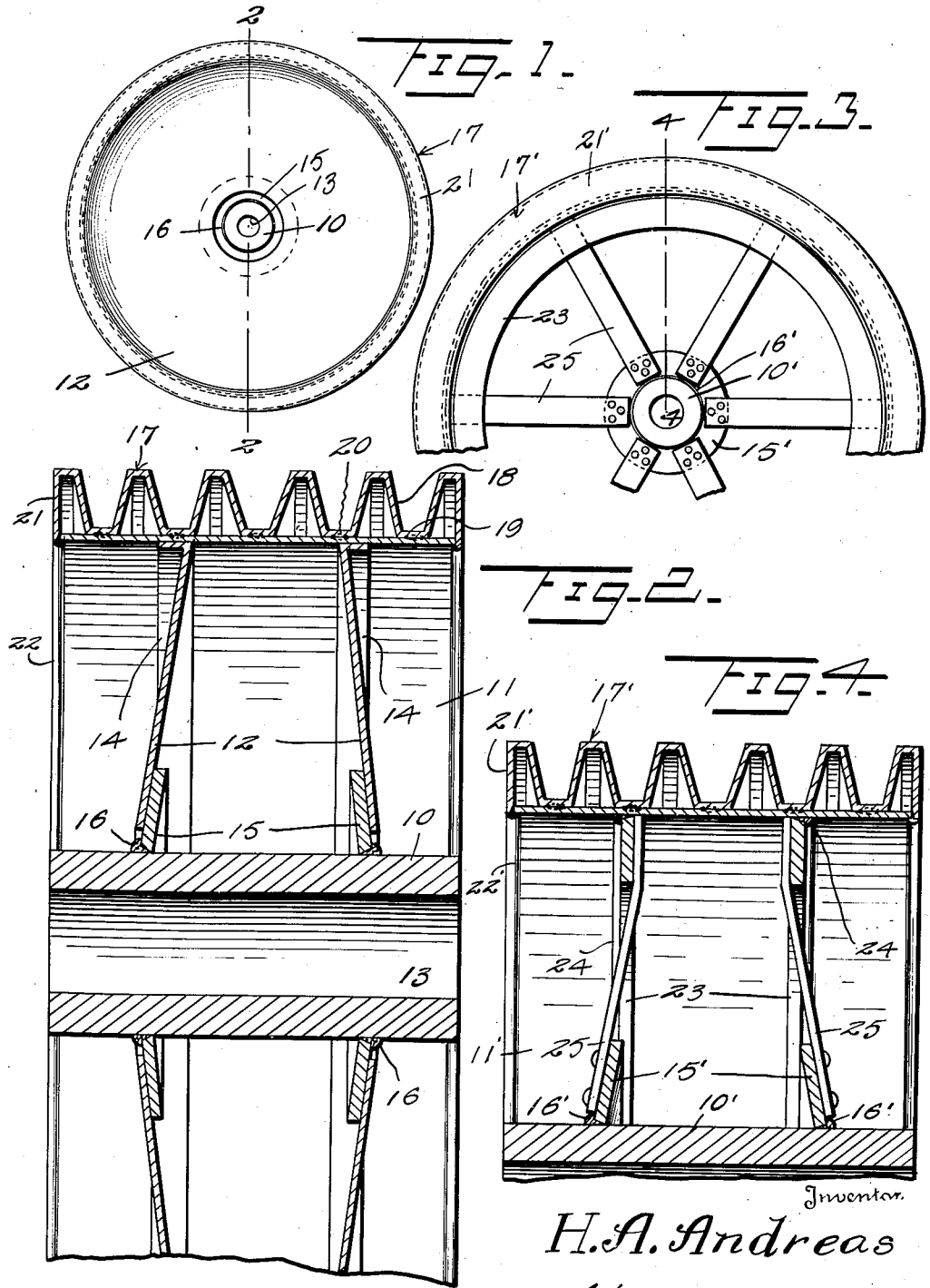
Inventor.
H. A. Andreas
By Watson E. Coleman
Attorney Patented May 3, 1938

2,115,837

UNITED STATES PATENT OFFICE 2,115,837

PULLEY

Harry A. Andreas, Muscatine, Iowa

Application March 11, 1937, Serial No. 130,377

1 Claim. (Cl. 74—230.8)

This invention relates to pulleys and more particularly to an improved pulley of the sheet metal type which is adapted to have a plurality of V-shaped belts trained thereover.

An object of this invention is to provide an improved sheet metal pulley which is relatively light in construction and which may be assembled by means of welding or the like and which is sufficiently strong to withstand the wear to which a pulley of this type is subjected.

Another object of this invention is to provide in a pulley of this type an annular grooved means engaging the periphery of the rim which is so constructed that any number of grooves may be formed therein with the ends of the grooved member engaging against the ends of the rim to which the grooved member is secured so that there will not be any waste space on the periphery of the pulley.

A further object of this invention is to provide a pulley of this character which may be provided with dished plates to secure the rim to the hub or which, in the larger pulleys, may be provided with spokes secured to dished members carried by the hub and annular members secured to the inside of the rim.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a detail side elevation of a pulley constructed according to an embodiment of this invention.

Figure 2 is an enlarged fragmentary sectional view taken on the line 2—2 of Figure 1.

Figure 3 is a fragmentary side elevation of a modified form of this invention.

Figure 4 is an enlarged fragmentary sectional view taken on the line 4—4 of Figure 3.

Referring to the drawing, the numeral 10 designates generally a hub of substantially cylindrical construction provided with the usual bore 13 therethrough to receive a shaft upon which the pulley 10 may be secured or, if desired, the hub 10 may be rotatably disposed on a shaft engaging within the bore 13.

A cylindrical rim 11 is disposed concentrically about the hub 10 and the inside of the rim 11 has a pair of disk members or dished plates 12, secured thereto as by welding or the like. The disk members 12 are provided on their outer edge portions with cylindrical flanges 14 contacting with the inside face of the rim 11 and these flanges 14 are secured, as by spot welding or the like, to the rim 11.

A pair of dished plates 15 are secured as by welding 16 in spaced apart relation to the hub 10 with the concave faces thereof in confronting relation. These dished members 15 are relatively thicker than the disk members 12 so as to provide reinforcing flanges on the hub 10. The disk members 12 may be secured to the outer faces of the inner disk members or concave flanges 15 by welding or other suitable fastening means so that the rim 11 will be supported concentrically of the hub 10.

A cylindrical tread member, generally designated as 17, is mounted on the periphery of the rim 11 and comprises a cylindrical sheet of metal which is provided with a plurality of V-shaped grooves or depressions 18, the bottoms 19 of which are secured as by spot welding 20 or the like to the periphery of the rim 11. This cylindrical tread member 17 is provided with parallel opposite end portions 21 which are relatively wider than the depth of the grooves 18 formed in this member 17 so that the inner edges of the end members 21 will overlap the opposite ends of the cylindrical rim 11. The inner edges of the end members 21 are adapted to be tightly secured to the ends of the rim 11 by means of welding 22, in the form of arc welding or the like.

In Figures 3 and 4 there is disclosed a modified form of this pulley or wheel wherein the hub 10' has a pair of dished flanges 15' secured to the periphery thereof in spaced apart relation with the concave faces thereof in confronting relation. The flanges 15' are adapted to be secured to the hub 10' by means of welding 16' or the like. The rim 11' has secured to the periphery thereof a grooved annulus 17' similar in every detail to the annulus 17 with the end portions 21' thereof overlapping the opposite ends of the rim 11' and secured thereto by welding 22'. The rim 11' has secured to the inside surface thereof, a pair of annular members 23 which are secured, as by welding 24, to the rim 11' and preferably these annular members 23 are disposed in parallel relation. The hub 10' is held concentrically of the rim 11' by means of a plurality of spokes 25 which are secured at their inner ends to the outer faces of the flanges 15' and at their outer ends to the inner faces of the annular members 23.

A pulley constructed according to this invention may be constructed out of relatively light sheet metal which is suitably reinforced at the points of extreme stress and the pulley has on the periphery thereof a plurality of V-shaped grooves extending substantially from one edge to the opposite edge of the rim 11.

It is, of course, understood that various changes and modifications may be made in the details of construction and design of the above specifically described embodiment of this invention without departing from the spirit thereof, such changes and modifications being restricted only by the scope of the following claims.

I claim:—

A sheet metal pulley comprising a cylindrical rim, a hub, a pair of dished flanges engaging about the hub, means for securing the inner edges of said flanges on the hub in spaced apart relation with the concave faces thereof in confronting relation, a pair of dished disk members overlapping said flanges, means for securing said disk members to said flanges, a cylindrical peripheral flange carried by each disk member engaging against the inside face of said rim, a grooved annular member engaging the periphery of the rim, means engaging in the grooves of said annular members securing said annular member to said rim, parallel end members integral with said grooved member, said end members overlapping the opposite ends of the rim, and means for securing said end members to said rim.

HARRY A. ANDREAS.